United States Patent [19]

Kosuge

[11] Patent Number: 4,832,399

[45] Date of Patent: May 23, 1989

[54] FRONT BODY FOR FOUR WHEELED VEHICLE OPERATED BY A DRIVER IN SITTING POSTURE

[75] Inventor: Hideyoshi Kosuge, Hyogo, Japan

[73] Assignee: Kawasaki Jukogyo Kabushiki Kaisha, Japan

[21] Appl. No.: 91,891

[22] Filed: Sep. 1, 1987

[30] Foreign Application Priority Data

Sep. 9, 1986 [JP] Japan .................. 61-138039

[51] Int. Cl.$^4$ ............................. B62D 25/08
[52] U.S. Cl. .................. 296/194; 296/198; 180/89.1
[58] Field of Search ............ 296/78 R, 78.1, 185, 296/186, 193, 194, 198, 204, 205; 180/89.1, 90.6

[56] References Cited

U.S. PATENT DOCUMENTS

| | | | |
|---|---|---|---|
| 2,507,421 | 5/1950 | Rose | 296/205 X |
| 4,449,748 | 5/1984 | Fiala et al. | 296/183 |
| 4,521,049 | 6/1985 | Genma et al. | 296/185 |
| 4,535,869 | 8/1985 | Tsutsumikoshi et al. | 180/89.1 X |
| 4,648,650 | 3/1987 | Fujii et al. | 296/78.1 X |
| 4,687,217 | 8/1987 | Stewart | 296/198 X |

FOREIGN PATENT DOCUMENTS

| | | | |
|---|---|---|---|
| 1354620 | 1/1964 | France | 296/185 |
| 61-66089 | 5/1986 | Japan . | |
| 2076762 | 12/1981 | United Kingdom | 296/198 |

*Primary Examiner*—Dennis H. Pedder
*Attorney, Agent, or Firm*—Leydig, Voit & Mayer

[57] ABSTRACT

A front body for a four wheeled vehicle operated by a driver in a sitting posture includes a flat upper portion having an inverted U-shaped cross-section and inclined toward the front end thereof, the upper portion being mounted on the upper portion of a steering device supporting frame mounted on the front portion of an under-frame-shaped main frame, an inner portion or a floor having an L-shaped cross-section as viewed from the side thereof and a rearwardly open U-shaped horizontal cross-section, the inner portion or floor being disposed behind and below the upper portion and connected to the steering device supporting frame and a floor plate for a driver's seat, side panels connected to flanges provided on two side edges of the inner portion or floor, rubber covers having an inverted L-shaped transverse cross-section, the rubber covers being disposed below the two sides of the upper portion and connected to the lower ends of two side plates of the upper portion, and fender flaps each of which has an inwardly bent front portion and a downwardly bent rear portion, the fender flaps being connected to the front end surface of the upper portion, the outer, lower ends of the two sides of the upper portion, and the front ends of the side plates.

4 Claims, 8 Drawing Sheets

FRONT BODY FOR FOUR WHEELED VEHICLE OPERATED BY A DRIVER IN SITTING POSTURE

BACKGROUND OF THE INVENTION

1. Field of the Invention

The present invention relates to a four wheeled vehicle or buggy for use in carrying loads on a stock farm, agricultural land or wasteland, and, more particularly, to a novel front body for a four wheeled vehicle having a round steering wheel and operated by a driver in a sitting posture.

2. Prior Art

Three or four wheeled buggies have been developed as small size vehicles suitable for use in travelling over a stock farm, agricultural land or wasteland. Such vehicles are driven by a driver who assumes a horseback riding posture, as in the case of a motorcycle, and are steered by using a handle bar-like steering means. Japanese Utility Model Laid-Open No. 66089/1986 discloses one example of such buggies.

These vehicles driven by a driver in a horseback riding posture, however, suffer from problems in that they cannot provide a driver with easy access to the seat. Further, the type of travel encountered over bumpy land by such vehicles makes the operation of the handle bar steering means heavy, thus causing a driver to become tired after a ride of many hours. Also, the loads that can be carried by such vehicles is restricted, and their structures do not permit carrying of passengers.

Accordingly, a four wheeled vehicle operated by a driver in a sitting posture and having a round steering wheel has been proposed. In this type of four wheeled vehicle, the arrangement or layout of the steering device and the driving device is quite different from that employed in a four wheeled vehicle operated by a driver in a horseback riding posture, and its chassis is, therefore, constructed such as to be suited to this new arrangement and to ensure easy maintenance and easy access to the seat. It also has a structure which allows a relatively large load to be carried, as well as a number of passengers.

This chassis structure will be described below with reference to FIGS. 7 and 8. A main frame 1 is a flat underframe, and has a narrowed front portion. A steering device supporting frame 3 is mounted on the front portion of the main frame 1. A portion of the main frame 1 which is behind the steering device supporting frame 3 forms a flat floor plate mounting section 4. Both sides of this floor plate mounting section 4 are provided with horizontally laid step mounting frames 5. A seat mounting frame 6 is mounted on the main frame 1 behind the floor plate mounting section 4. Behind and connected to the seat mounting frame 6, and at the rear end of the main frame 1, is mounted an engine supporting frame 7. The engine supporting frame 7 has upper sides 7a at the midpoint of which the engine supporting frame 7 is supported by inclined frames 2 connected to the rear end of the main frame 1. A space below the engine supporting frame 7 and the seat mounting frame 6 forms a driving device mounting space 8.

With the thus-arranged chassis, the steering device supporting frame 3 can carry, as shown by a solid line in FIG. 7, a steering device 12 comprising a steering column shaft 12a, an intermediate shaft 12b, and a rack and pinion gear 12c; a shock absorbing device comprising a known strut 13a, a knuckle arm 13b, and a lower arm (not shown); and a shift control device 14. On the floor plate mounting section 4 can be mounted a floor plate 15, and on the step mounting frames 5 provided at the both sides of the floor plate mounting section 4 can be mounted steps. A seat 17 can be supported on the seat mounting frame 6. A load-carrying platform 18 can be supported on the engine supporting frame 7 in such a manner that is extends rearward from a point immediately behind the seat 17. The driving device mounting space 8 located below the seat mounting frame 6 and the engine supporting frame 7 can accommodate an engine 19 and a power train 20 in such a manner that these devices do not protrude below the main frame 1.

When the various devices and members are mounted on the chassis in the above-described manner, the steering device 12 and the shock absorbing device 13 supported on the steering device supporting frame 3 are exposed at the front portion of the car body, leaving a possibility of these devices being damaged by mud splashed onto them by the wheels. Also, it is necessary to provide mudguards above front wheels 21 that are supported by an independent suspension system (not shown) on both sides of the main frame 1. To cope with this situation, it is general practice for a fender to be employed which serves as a body covering the front portion of the car body, as well as covering the front wheels 21 in place of mudguards. Such a fender also needs to be capable of being easily assembled from a small number of parts.

SUMMARY OF THE INVENTION

Accordingly, an object of this invention is to provide a front body for a four wheeled buggy driven by a driver in a sitting posture capable of satisfying the above-described requirements.

To achieve the above-described object, the present invention provides a front body for a four wheeled vehicle operated by a driver in a sitting posture which comprises an upper portion having a substantially inverted U-shaped cross-section and declined toward the front end thereof, the upper portion being mounted on an upper portion of a steering device supporting frame mounted on the front portion of an underframe-shaped main frame, a substantially inner portion or floor having an L-shaped cross-section as viewed from the side thereof and a substantially rearwardly open U-shaped horizontal cross-section, the inner portion or floor being disposed below and extending rearwardly of the upper portion and mounted on the steering device supporting frame, and rubber covers having an inverted L-shaped transverse cross-section, each of the rubber cover being disposed below one of two sides of the upper portion and mounted on the lower ends of two side plates of the upper portion.

When mounted in the front portion of a car body, the front body arranged in the above-described manner can cover the front wheels from above, serving as a fender.

The number of parts used in the front body is decreased, and the front body can therefore be easily assembled. These factors increase the workability of the front body, and enable easy access to the devices and members accommodated in the front portion of the car body when they need maintenance.

DESCRIPTION OF THE PREFERRED EMBODIMENTS

A first embodiment of the present invention will be hereinunder described with reference to FIGS. 1 to 6.

Figure 1:
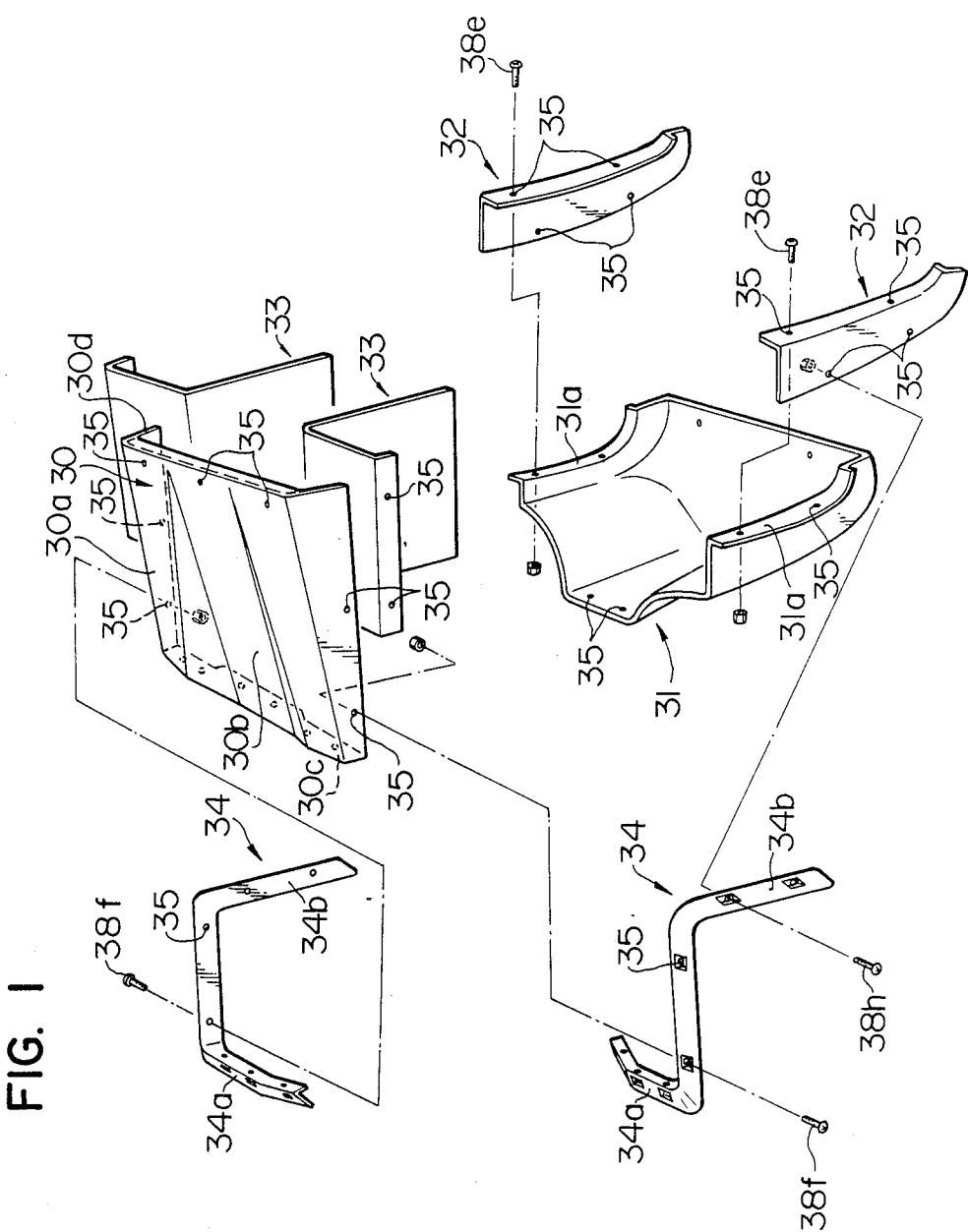
FIG. 1 is an exploded and perspective view of a front body.

Referring first to FIG. 1, a front body of a four wheeled buggy driven by a driver in a sitting position includes a flat upper portion 30 having an inverted U-shaped cross section. The upper body portion 30 has an upper surface 30a which is declined forward. The upper surface 30a is provided with a protrusion or recess 30b which is disposed at the center thereof and is gradually deepening toward the front end of the upper surface 30a from the rear end thereof. The front end of the upper surface 30a is provided with a flat, U-shaped strip 30c (shown in FIGS. 1 and 3). The front body also includes an inner portion or a floor 31 having an L-shaped cross section as viewed from the side thereof and an inverted U-shaped horizontal cross-section, the inner portion 31 being disposed behind and below the upper portion 30, side panels 32 having an L-shaped horizontal cross-section and connected to flanges 31a provided at both side edges of the inner portion or floor 31, rubber covers 33 disposed below the two sides of the upper portion 30 and connected to the lower ends of side plates 30d of the upper portion 30, the rubber covers 33 having an inverted L-shaped longitudinal cross-section, and fender flaps 34 connected to the strip 30c forming the front end surface of the upper portion 30, the lower, outer ends of the two side plates 30d, and the front ends of the side panels 32. The fender flaps 34 each have a front portion 34a which is bent inwardly in such a manner that it forms an L shape, and a rear portion 34b which is bent vertically in such a manner that it forms an inverted L shape.

The connecting portion of each of these members is provided with at least one screw inserting through-holes 35.

Figure 2:
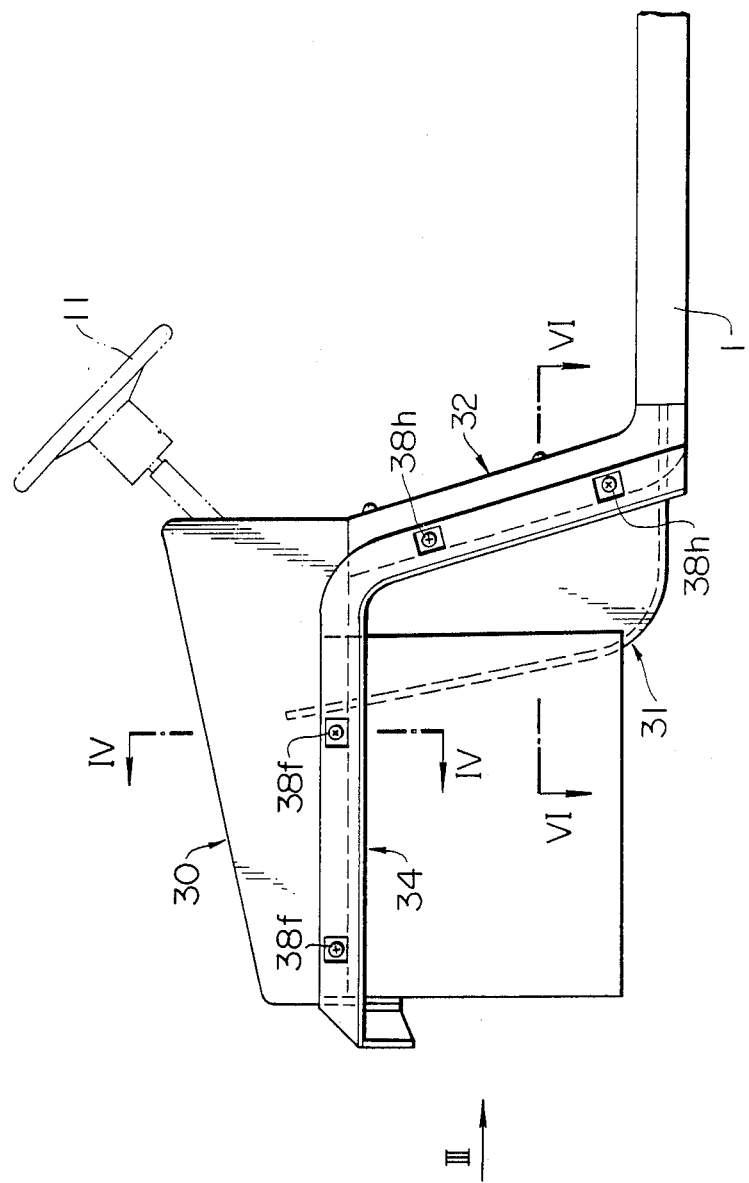
FIG. 2 is a side elevational view of the assembled front body.
Figure 3:
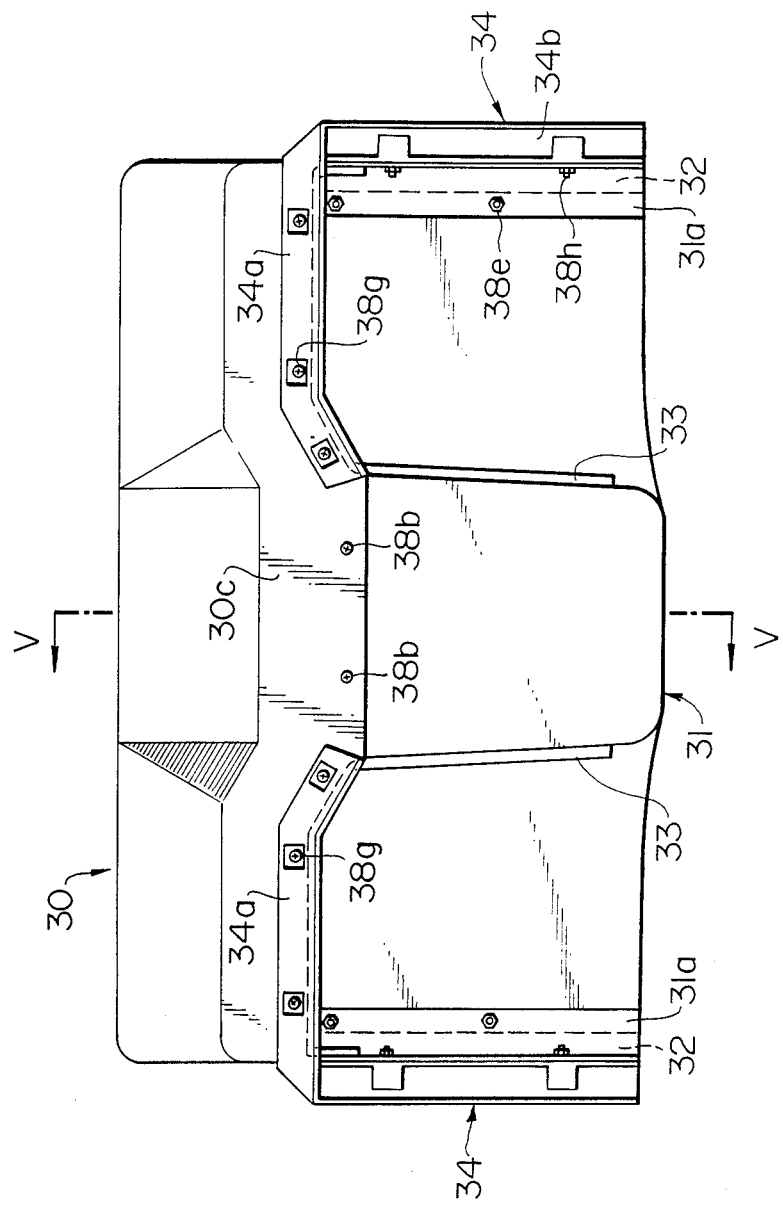
FIG. 3 is a view as seen when looking in the direction of the arrow III in FIG. 2.
Figure 4:
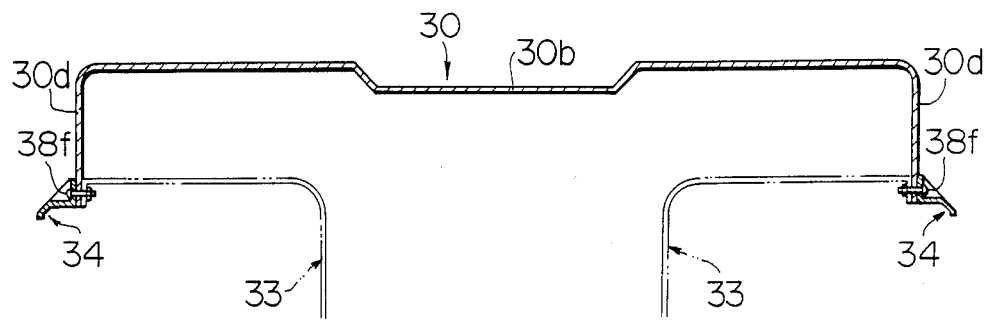
FIG. 4 is a section taken along the line IV—IV of FIG. 2.
Figure 5:
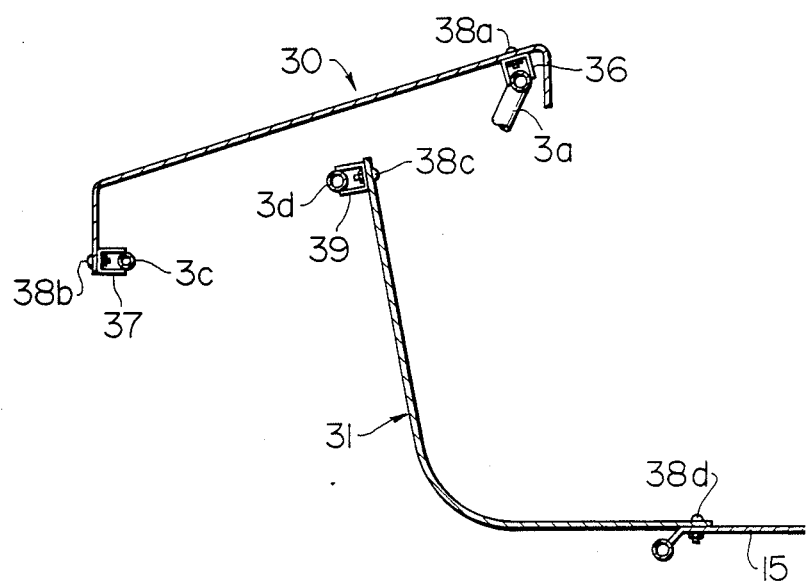
FIG. 5 is a section taken along the line V—V of FIG. 3.
Figure 6:
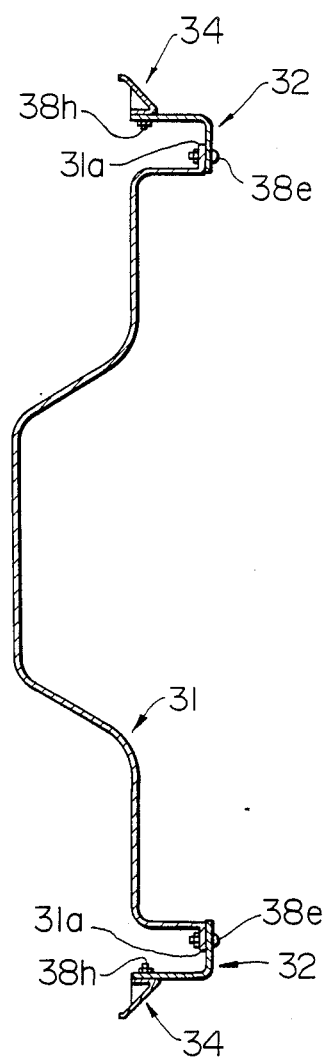
FIG. 6 is a section taken along the line VI—VI of FIG. 2.
Figure 7:
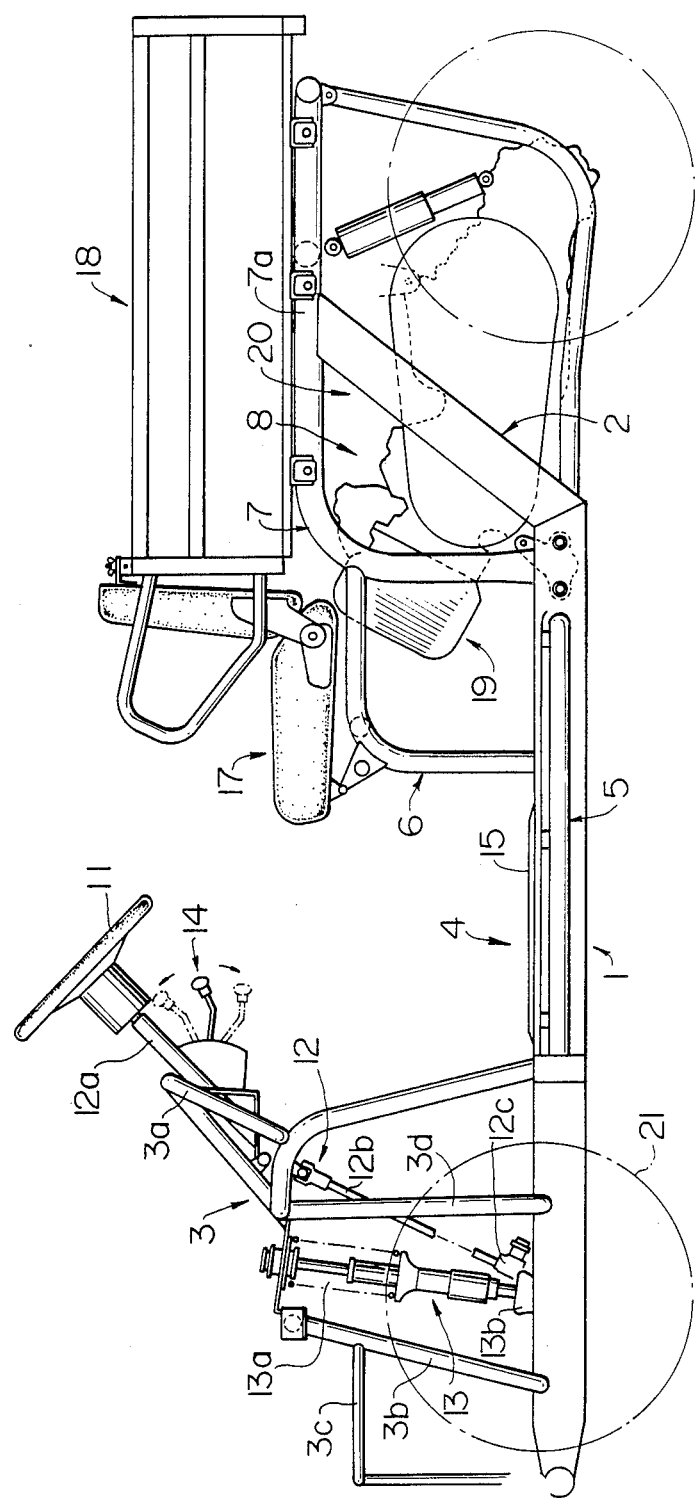
FIG. 7 is a side elevational view of a chassis of a four wheeled buggy driven by a driver in a sitting posture.
Figure 8:
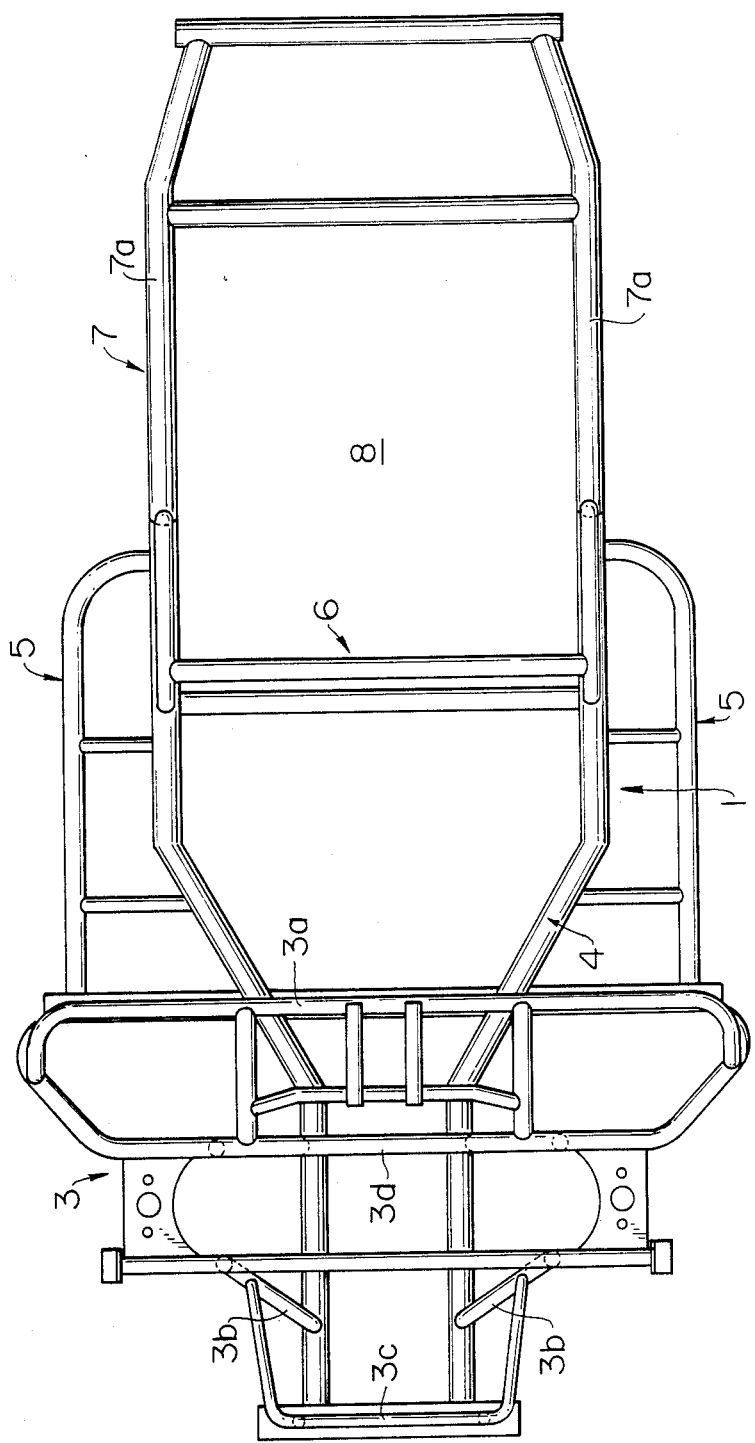
FIG. 8 is a plan view of the chassis of FIG. 7.

In order to assemble the front body of the four wheeled buggy driven by a driver in a sitting posture from the above-described members, the upper portion 30 is first fixed by screws 38a, 38b to a bracket 36 (FIG. 5) fixed to the upper side of an upper pipe 3a of the steering device supporting frame 3 (see FIG. 7) and to a bracket 37 fixed to the front portion of a cross pipe 3c having a U-shape as viewed from above and connected to the intermediate portions of front suspension pipes 3b. Next, the inner portion or floor 31 is disposed behind and below the upper portion 30, as shown in FIG. 5, and the center of the upper end of the inner portion is then fixed by a screw 38c to a bracket 39 shown in FIG. 5 and fixed at the midpoint of an upper side of a lower pipe 3d of the steering device supporting frame 3 shown in FIG. 7, while the rear end of the floor is fixed by a screw 38d to the front end of the floor plate 15 for a driver's seat. Subsequently, the side panels 32 are fixed by screws 38e to the two flanges 31a of the inner portion or floor 31, as shown in FIG. 6. Then, the rubber covers 33 are disposed below the two sides of the upper portion 30, as shown in FIG. 4, and the upper ends of the rubber covers 33 are fixed to the lower, inner ends of the side plates 30d of the upper portion 30 by screws 38f. The fender flaps 34 are then disposed outside the two sides of the upper portion 30, the inwardly bent front portions 34a of the fender flaps 34 are fixed by screws 38g to the strip 30c of the body upper portion 30, as shown in FIG. 3, the intermediate portions of the fender flaps 34 are fixed by the screws 38f to the side plates 30d of the body upper portion 30 together with the rubber covers 33, as shown in FIG. 4, and the rear portions 34b are fixed by screws 38h to the front ends of the side panels 32, as shown in FIGS. 2 and 6.

The thus-assembled front body makes it possible for the steering device 12 and the shock absorbing device 13 supported on the steering device supporting frame 3 at the front portion of the car body to be covered from above and from the side of the driver's seat. It also covers the front wheels 12 from above, and serves as a mudguard.

Figure 9:
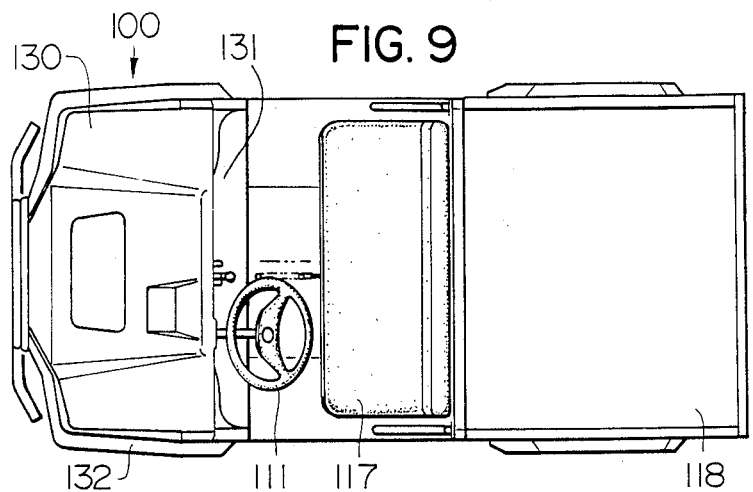
FIG. 9 is a plan view of a four wheeled buggy driven by a driver in a sitting position, showing another embodiment of the present invention.
Figure 10:
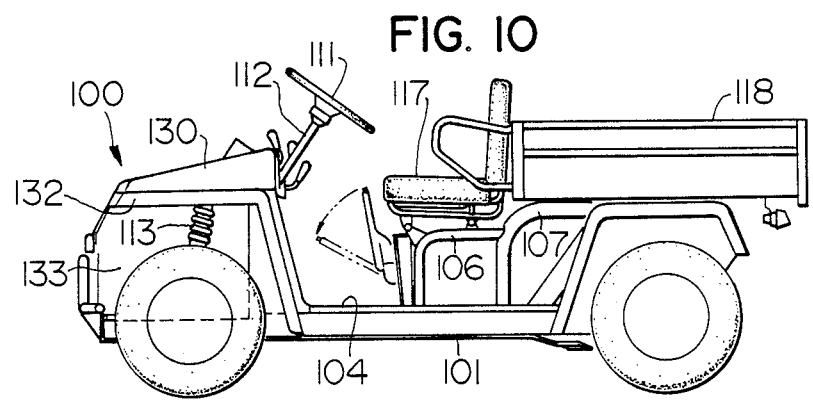
FIG. 10 is a side elevational view of the buggy of FIG. 9.
Figure 11:
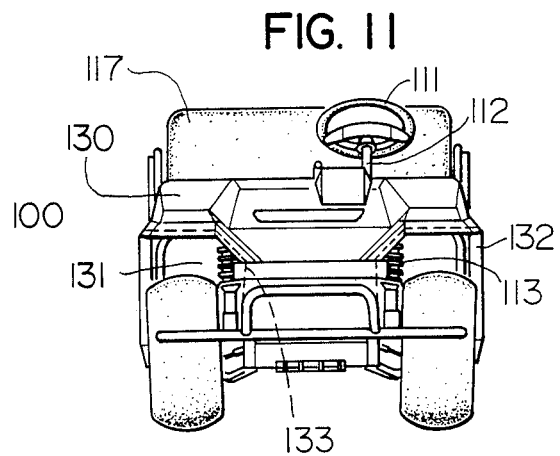
FIG. 11 is a front view of the buggy of FIG. 9.

A second embodiment of the present invention will be described with reference to FIGS. 9 and 11.

A chassis of a four wheeled buggy 100 includes an underframe-shaped main frame 101, a floor plate 104 mounted on the main frame 101, a seat mounting frame 106, a seat 117 mounted on the seat mounting frame 106, an engine supporting frame 107, and a load carrying platform 118 mounted on the engine supporting frame 107. At the front portion of the main frame 101 are mounted a steering device 112 having a steering wheel 111, a shock absorbing device 113, and a front body 100 according to the present invention. The front body 100 comprises an upper body portion 130, an inner portion 131, side panels 132, and rubbers 133.

As will be understood from the foregoing description, the front body for the four wheeled vehicle driven by a driver in a sitting position according to this invention can cover the various devices and members incorporated in the front portion of the car body from above and from the side of the driver's seat, as well as serving as a fender which covers the front wheels from above.

Further, it employs a decreased number of parts and is therefore easily assembled. These factors can increase the workability of the front body, and enable easy access to the devices and members incorporated in the front portion of the car body when they need maintenance.

What is claimed is:

1. A front body for a four wheeled vehicle operated by a driver in a sitting posture and including a main frame, and a steering device supporting frame mounted on a front portion of said main frame, comprising:

an upper portion having a substantially inverted U-shaped cross-section and declined toward a front end thereof, said upper portion being mounted on an upper portion of said steering device supporting frame;

an inner portion having a substantially L-shaped cross-section as viewed from the side thereof and a substantially rearwardly open U-shaped horizontal cross-section, said inner portion being disposed below and extending rearwardly of said upper portion and mounted on said steering device supporting frame; and rubber covers having an inverted L-shaped transverse cross-section, each of said rubber covers being disposed below one of two opposing sides of said upper portion and mounted on the lower ends of two side plates of said upper portion.

2. A front body for a four wheeled vehicle operated by a driver in a sitting posture according to claim 1, wherein said inner portion is mounted on a floor plate for a driver's seat that is mounted on said main frame, and said inner portion also serving as part of a floor.

3. A front body for a four wheeled vehicle operated by a driver in a sitting posture according to claim 2, including side panels mounted on flanges provided on two side edges of said inner portion.

4. A front body for a four wheeled vehicle operated by a driver in a sitting posture according to claim 3, including fender flaps, each of which has an inwardly bent front portion and a downwardly bent rear portion, said fender flaps being mounted on the front end surface of said upper portion, the outer, lower ends of said two side plates of said upper portion, and front ends of said side panels.

* * * * *